United States Patent
Childress et al.

(10) Patent No.: US 10,513,838 B2
(45) Date of Patent: Dec. 24, 2019

(54) HYDRANT CAP WITH RETAINER

(71) Applicant: Mueller International, LLC, Atlanta, GA (US)

(72) Inventors: Justin Blaine Childress, Albertville, AL (US); Christopher Joseph Duckett, Albertville, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/860,818

(22) Filed: Jan. 3, 2018

(65) Prior Publication Data

US 2019/0203450 A1    Jul. 4, 2019

(51) Int. Cl.
   *E03B 9/02*    (2006.01)
   *E03B 9/06*    (2006.01)
   *F16K 35/10*   (2006.01)
   *A62C 31/02*   (2006.01)

(52) U.S. Cl.
   CPC .............. *E03B 9/06* (2013.01); *F16K 35/10* (2013.01); *A62C 31/02* (2013.01); *Y10T 137/5468* (2015.04)

(58) Field of Classification Search
   CPC ....... Y10T 137/5468; E03B 9/02; E03B 9/06; A62C 31/02
   See application file for complete search history.

(56) References Cited

U.S. PATENT DOCUMENTS

| | | | | |
|---|---|---|---|---|
| 1,316,799 A | * | 9/1919 | Menige | E03B 9/02 137/302 |
| 1,553,953 A | * | 9/1925 | O'Brien | E03B 9/02 137/299 |
| 2,200,770 A | * | 5/1940 | McCombs | E03B 9/04 137/284 |
| D190,986 S | | 7/1961 | Watkins | |
| 4,083,377 A | * | 4/1978 | Luckenbill | E03B 9/04 137/296 |
| 4,177,826 A | * | 12/1979 | Luckenbill | E03B 9/04 137/272 |

(Continued)

FOREIGN PATENT DOCUMENTS

| | | | | |
|---|---|---|---|---|
| CA | 2799961 A1 | * | 12/2011 | ............... E03B 9/08 |
| CA | 2929888 A1 | * | 5/2015 | ............. A62C 35/20 |
| WO | WO-2007085250 A1 | * | 8/2007 | ............... E03B 9/06 |

OTHER PUBLICATIONS

Jones; Catalog for "Section 8—Fire Protection", revised Nov. 2016, 8 pgs.

(Continued)

*Primary Examiner* — Eric Keasel
*Assistant Examiner* — Kevin R Barss
(74) *Attorney, Agent, or Firm* — Taylor English Duma LLP

(57) ABSTRACT

A hydrant includes a hydrant body defining a top end and a bottom end distal from the top end, the top end defining a barrel diameter and an opening; and a hydrant cap defining an upper surface facing away from the hydrant body and a lower surface facing toward the top end of the hydrant body, the hydrant cap defining a cap diameter, the cap diameter being greater than the barrel diameter; and a cap fastener, the hydrant cap secured to the top end of the hydrant body with the cap fastener, a portion of the cap fastener extending through the opening defined in the top end of the hydrant body.

29 Claims, 7 Drawing Sheets

(56) References Cited

U.S. PATENT DOCUMENTS

| | | | | |
|---|---|---|---|---|
| 4,227,544 A | * | 10/1980 | Luckenbill | E03B 9/04 137/307 |
| 4,398,556 A | * | 8/1983 | Pereira | E03B 9/02 137/296 |
| D282,109 S | | 1/1986 | Golden | |
| D307,402 S | | 4/1990 | Rouse, Jr. et al. | |
| D314,227 S | | 1/1991 | Christ | |
| 5,383,495 A | * | 1/1995 | Kennedy | E03B 9/06 137/296 |
| 5,722,450 A | * | 3/1998 | Julicher | E03B 9/06 137/296 |
| 5,727,590 A | * | 3/1998 | Julicher | E03B 9/06 137/296 |
| 6,733,045 B2 | | 5/2004 | Harrington et al. | |
| 6,802,338 B1 | * | 10/2004 | Istre, Jr. | E03B 9/06 137/296 |
| 7,559,338 B2 | | 7/2009 | Scobie et al. | |
| 7,797,972 B2 | | 9/2010 | Nickeas et al. | |
| D631,134 S | | 1/2011 | German et al. | |
| 8,302,623 B1 | | 11/2012 | Nichols | |
| 8,443,834 B2 | | 5/2013 | Williams | |
| D734,585 S | | 7/2015 | Brennan | |
| D844,115 S | | 3/2019 | Burton | |
| D852,932 S | | 7/2019 | Childress et al. | |

OTHER PUBLICATIONS

Jones; Specification sheet for "Fire Hydrant—2 Nozzle Ductile Iron (J4040)", revised May 6, 2016, 1 pg.
Jones; Specification sheet for "Fire Hydrant—2 Nozzle Ductile Iron (J4040HP)", revised May 6, 2016, 1 pg.
Clow Valve Co.; Product Brochure for "Wet Barrel Fire Hydrants", publicly available on Feb. 26, 2015, according to Wayback Machine, 2 pgs.
Childress, Justin Blaine; Corrected Notice of Allowance for Design U.S. Appl. No. 29/656,523, filed Jan. 13, 2018, dated May 3, 2019, 7 pgs.
Childress, Justin Blaine; Notice of Allowance for U.S. Appl. No. 29/656,523, filed Jul. 13, 2018, dated Apr. 17, 2019, 13 pgs.

* cited by examiner

HYDRANT CAP WITH RETAINER

TECHNICAL FIELD

Field of Use

This disclosure relates to hydrants. More specifically, this disclosure relates to caps for hydrants.

Related Art

A hydrant can be and typically is installed in public locations where it is easily accessible by local firefighters and other workers and is often also easily visible by the public. Such a hydrant, including, for example, a wet-barrel fire hydrant, can have a top end that is substantially horizontal and might be able to receive markings or easily visible indicia to identify the hydrant were the typical top end of such a hydrant not so small.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a hydrant comprising: a hydrant body defining a top end and a bottom end distal from the top end, the top end defining a barrel diameter and an opening; and a hydrant cap defining an upper surface facing away from the hydrant body and a lower surface facing toward the top end of the hydrant body, the hydrant cap defining a cap diameter, the cap diameter being greater than the barrel diameter; and a cap fastener, the hydrant cap secured to the top end of the hydrant body with the cap fastener, a portion of the cap fastener extending through the opening defined in the top end of the hydrant body.

In a further aspect, disclosed is a hydrant cap assembly comprising: a hydrant cap defining an upper surface and a lower surface distal from the upper surface, the lower surface defining a first threaded portion; and a cap fastener defining a second threaded portion, the second threaded portion of the cap fastener configured to engage the first threaded portion of the hydrant cap, both the hydrant cap and the cap fastener configured to be assembled to each other through an opening defined in a top end of a hydrant.

In yet another aspect, disclosed is a method of assembling a hydrant, the method comprising: positioning a hydrant cap of the hydrant above a top end of a hydrant body of the hydrant; aligning the hydrant cap with an opening defined in the top end of a hydrant body; installing a cap fastener through and from an inside cavity of the hydrant body into the hydrant cap; tightening the cap fastener to secure the hydrant cap to the hydrant body.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 4 is a second side view of the hydrant of FIG. 1 taken from a direction orthogonal to the direction from which FIG. 3 is taken.

DETAILED DESCRIPTION

Figure 1:
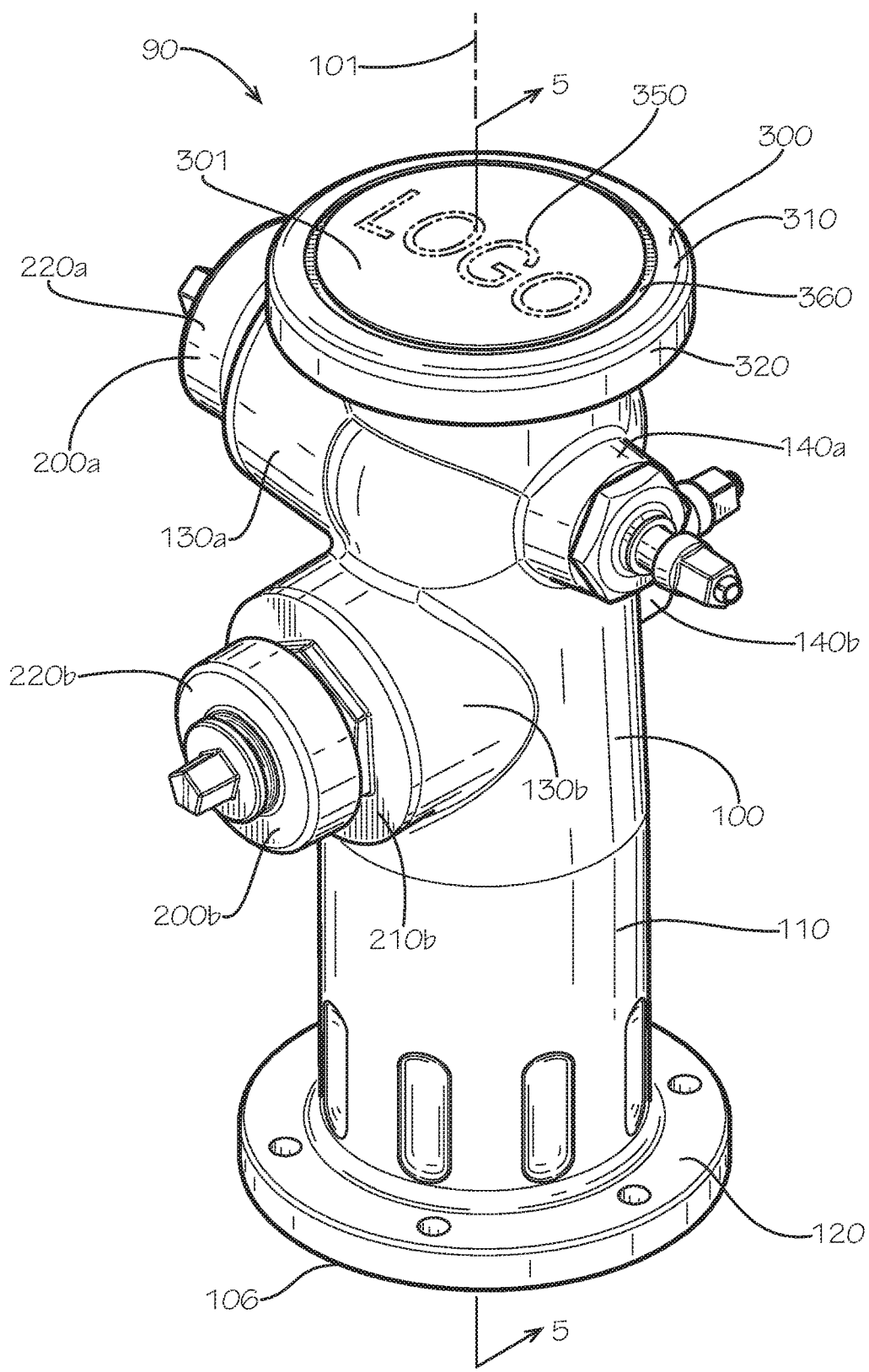
FIG. 1 is perspective view of a hydrant in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "upper," "lower," "inside," "outside," "inboard," "outboard," "horizontal," and/or "vertical" may be referenced. Unless stated otherwise, "top" describes that end of the hydrant nearest to a bonnet or a top end of the hydrant; and "bottom" is that end of the hydrant that is opposite or distal the top and generally, although not always, located underground. "Horizontal" or "horizontal orientation" describes that which is in a plane extending from left to right and aligned with the horizon. "Vertical" or "vertical orientation" describes that which is in a plane that is angled at 90 degrees to the horizontal.

In some aspects, a hydrant and associated methods, systems, devices, and various apparatuses are disclosed herein. In some aspects, the hydrant can comprise a hydrant cap and a cap fastener.

FIG. 1 shows a hydrant 90. In some aspects, the hydrant 90 can comprise a hydrant body 100 defining a top end 105 (shown in FIG. 5) and a bottom end 106 distal from the top end 105. The hydrant body 100 can comprise a barrel 110. The hydrant body 100 can comprise a flange 120 extending from the barrel 110 proximate to the bottom end 106. The flange 120 can be used to connect the hydrant body 100 to a water distribution system through another component of the system such as, for example and without limitation, a lower barrel (not shown), a check valve (not shown), or a hydrant shoe (not shown). The hydrant body 100 can comprise two primary valve bosses 130a,b extending from the barrel 110 and two secondary valve bosses 140a,b extending from the barrel 110. Each of the primary valve bosses 130a,b and the secondary valve bosses 140a,b can define a mounting surface for or otherwise accommodate a valve 200a,b. As shown, the primary valve boss 130a,b and the secondary valve boss 140a,b can be on opposite sides of the barrel 110. In some aspects, as shown, the hydrant 90 can comprise a pair of the valves 200a,b, each of which can be configured to accept a fire hose or a pumper of a unique size or a unique connection type and can be oriented in different directions as shown. In other aspects, the hydrant 90 can comprise only a single valve 200 or more than two valves 200. The barrel 110 of the hydrant body 100 can define an axis 101, which can extend the full length of the barrel 110 from the top end 105 to the bottom end 106.

The hydrant 100 can be connected to a water supply pipe or any other fluid supply pipe (not shown), which can be part of the aforementioned water distribution system. In some aspects, the hydrant 100 can be a wet-barrel fire hydrant. In a wet-barrel fire hydrant, water is stored inside an interior cavity 104 (shown in FIG. 6) of the hydrant 90 at least in part defined by an interior surface 102 (shown in FIG. 6) of the hydrant 100 even when the valves 200a,b are closed. In contrast, a dry-barrel fire hydrant (not shown) is so named because closure of a main valve keeps the interior cavity 104 of the hydrant 90 dry in normal operation.

The hydrant 90 can comprise a nozzle insert 210a,b (210a shown in FIG. 2) and a hose cap 220a,b at each of the respective valves 200a,b. Each of the hose caps 220a,b can be made removable for attachment of a hose or a pumper to the hydrant 90. In some aspects, the nozzle inserts 210a,b can also be made removable. In other aspects, the nozzle inserts 210a,b can be permanently secured to the hydrant body 100.

Figure 5:
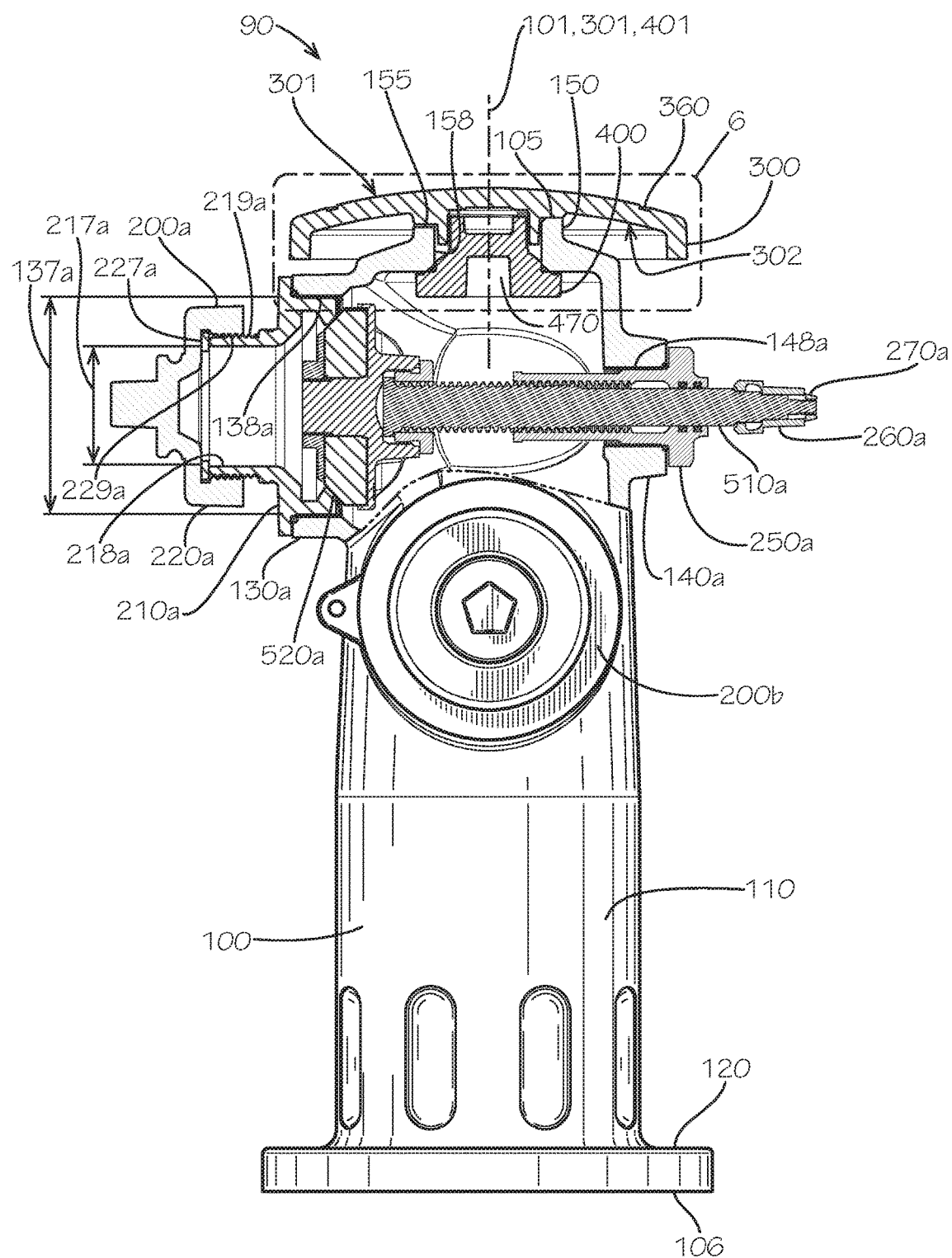
FIG. 5 is a partial cutaway view of the hydrant of FIG. 1 taken along line 5-5 of FIGS. 1 and 3.

The hydrant 90 can comprise a hydrant cap 300 defining an upper surface 301 and a lower surface 302 (shown in FIG. 5). The upper surface 301 of the hydrant cap 300 can face away from the hydrant body 100, and the lower surface 302 can face toward the top end 105 of the hydrant body 100. The hydrant cap 300 can comprise a main portion 310, a flange portion 320, and a boss portion 330 (shown in FIG. 6). The main portion 310 can be substantially horizontal in orientation. In some aspects, the main portion 310 can be flat. In other aspects, as will be described, the main portion 310 can be domed or curved or have another shape. The flanged portion 320 can extend from an outer edge of the main portion 310 and can be substantially vertical to hide a portion of the top end 105 of the hydrant body 100. Overall, the hydrant cap 300 can have a saucer shape and can form an "umbrella" over the top end 105 of the hydrant 90, defining a cavity between the top end 105 of the hydrant body 100 and the lower surface 302 of the hydrant cap 300.

The hydrant cap 300 can define indicia 350, which can comprise any text or artwork such as, for example and without limitation, a logo or a mark identifying an owner, a custodian, or a user of the hydrant 90. The owner, the custodian, or the user of the hydrant 90 can be, for example and without limitation, a municipality, a local fire department, or any other individual or entity. While other marks on the hydrant 90 such as a pressure rating, a manufacturer's stamp, a model number, regulatory agency certifications, a material type, a foundry stamp, or instructions for using the hydrant 90 (e.g., and indication of the direction for opening the valve 200a,b) can serve the purpose of communicating information about the hydrant 90, the indicia 350 can but need not communicate anything about the hydrant 90 itself. A specific design of the indicia 350 can itself be entirely ornamental and serve no purpose other than to pleasing aesthetically. The hydrant cap 300 can define a surface feature 360, which can be, for example and without limitation, a recessed surface feature such as a groove as shown, a protruding surface feature such as a ridge, or a combination of a recessed surface feature and a protruding surface feature.

Figure 2:
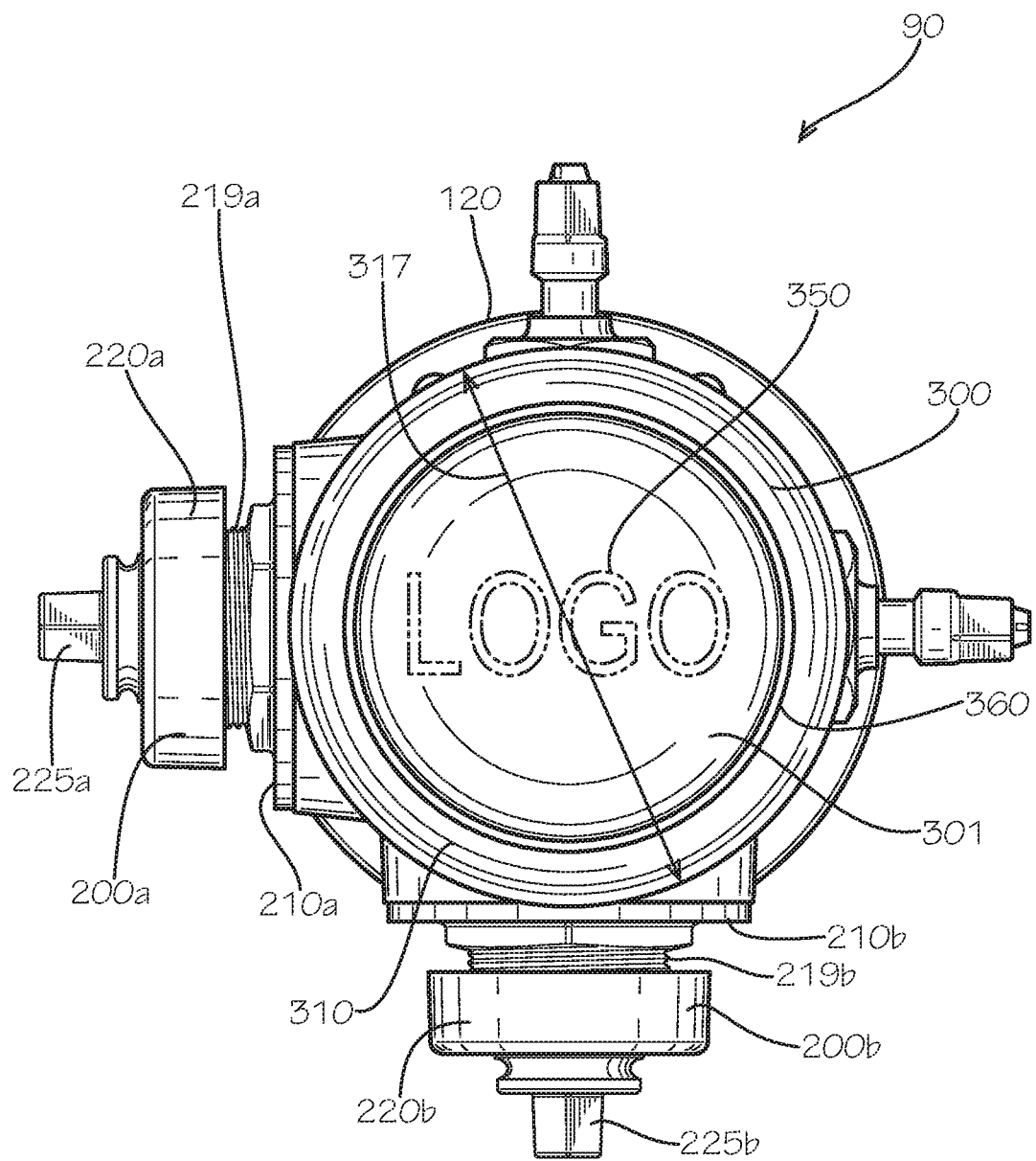
FIG. 2 is a top plan view of the hydrant of FIG. 1.

As shown in FIG. 2, in some aspects, each of the flange 120, the hydrant cap 300, and the surface feature 360 can define a circular shape. In other aspects, any of the flange 120, the hydrant cap 300, and the surface feature 360 can define a non-circular shape. The hydrant cap 300 can define a cap diameter 317, which can measure greater than a barrel diameter 107 (shown in FIG. 7) of the top end 105 of the barrel 110. As shown, each of the hose caps 220a,b of the valves 200a,b can comprise an operating nut 225a,b, which can be used in loosening and removing the respective hose cap 220a,b with a tool. Each of the nozzle inserts 210a,b can define a respective threaded portion 219a,b, which can be configured to threadably receive the hose cap 220a,b.

Figure 3:
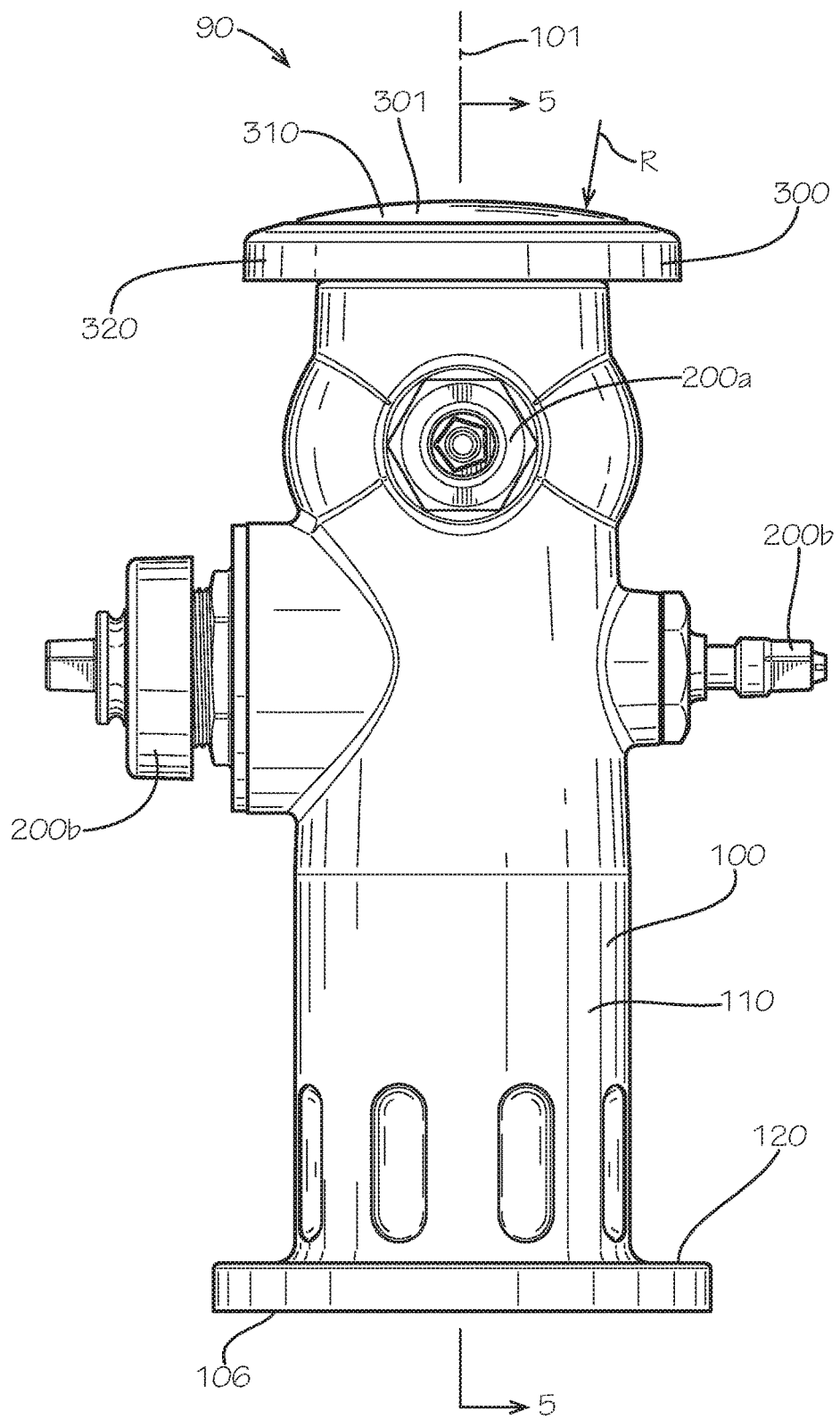
FIG. 3 is a first side view of the hydrant of FIG. 1.
Figure 4:
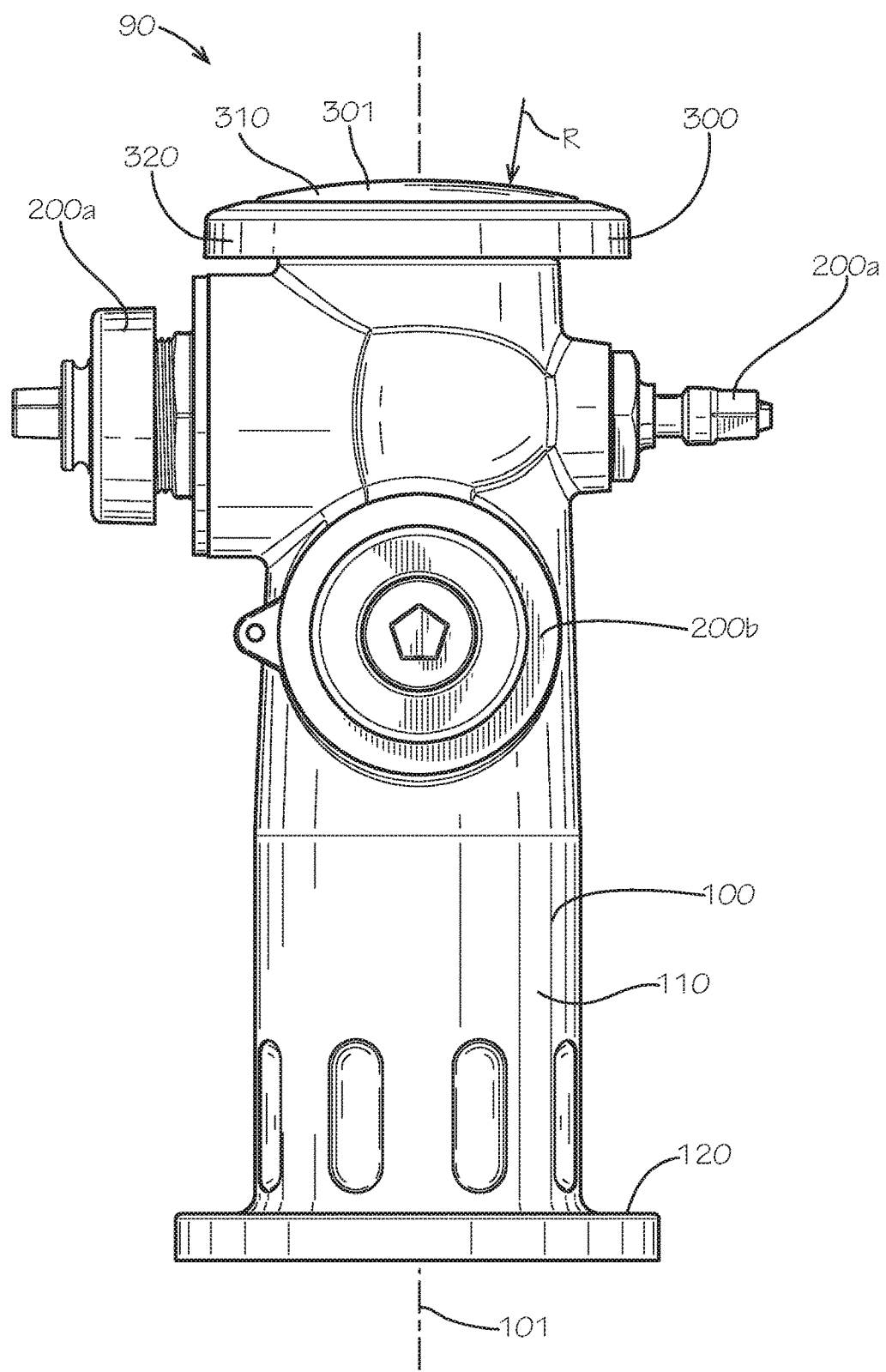

In some aspects, as shown in FIGS. 3 and 4, the upper surface 301 of the hydrant cap 300 can define a curved or domed shape having a radius R, which can be measured in any vertical plane in which the axis 101 of the hydrant 90 is coincident. In other aspects, the upper surface 301 can define another three-dimensional shape, which can vary when viewed in cross-section, even in vertical planes in which the axis 101 of the hydrant 90 is coincident.

As shown in FIG. 5, each valve of the hydrant 90 such as the valve 200a can comprise the nozzle insert 210a, the hose cap 220a, a stem insert 250a, a pent nut 260a, a pent nut retainer 270a, a hydrant stem 510a, and a hydrant disc assembly 520a. The nozzle insert 210a of the representative valve 200a shown in cross-section can be inserted inside the respective primary valve boss 130a. In some aspects, the nozzle insert 210a can be secured into a boss opening 138a defined by the primary valve boss 130a such that it can be removed and replaced at a later point. The boss opening 138a can define a boss opening diameter 137a. In other aspects, the nozzle insert 210a can be permanently secured into the boss opening 138a. In any case, the nozzle insert 210a can itself define a nozzle opening 218a and the aforementioned threaded portion 219a. The nozzle opening 218a can define a nozzle opening diameter 217a. The hose cap 220a can define a threaded portion 229a, which can engage the threaded portion 219a of the nozzle insert 210a. A seal 227a can be positioned inside the hose cap 220a between the hose cap 220a and the nozzle insert 210a. The seal 227a can be used to seal against leakage of fluid in the water distribution system from between the hose cap 220a and the nozzle insert 210a. Likewise, a seal (not shown) can be positioned between the nozzle insert 210a and the primary valve boss 130a. This seal can be used to seal against leakage of fluid in the water distribution system from between the nozzle insert 210a and the hydrant body 100.

The stem insert 250a of the representative valve 200a can be inserted into the respective secondary valve boss 140a. In some aspects, the stem insert 250a can be secured into a boss opening 148a defined by the secondary valve boss 140a such that it can be removed and replaced at a later point. In other aspects, the stem insert 250a can be permanently secured into the boss opening 148a.

The hydrant body 100 can comprise a boss 150 in the top end 105, which can define an opening 158. The opening 158 can be considered a first opening, while each of the boss opening 138a and the nozzle insert opening 218a can be considered a second opening.

As also shown, the hydrant 90 can comprise a cap fastener 400, which can be positioned below the upper surface 301 of the hydrant cap 300 and can be engaged to the hydrant cap 300 to secure the hydrant cap 300 to the hydrant body 100. As shown, at least a portion of the cap fastener 400 can be positioned inside the hydrant body 100. As will be described in further detail below, the cap fastener 400 can define a recessed portion 470, which can be sized to receive a tool for rotating and tightening the cap fastener 400. The cap fastener 400 can also define an axis 401. Likewise, the hydrant cap can define an axis 301. As shown, the axis 401 of the cap fastener 400 can be aligned with the axis 301 of the hydrant cap 300 and the axis 101 of the hydrant body 100. The hydrant body 100 can further define an anti-rotation feature 155 defined in a feature such as in, for example and without limitation, the boss 150. The cap fastener 400 can be considered a retainer.

Figure 6:
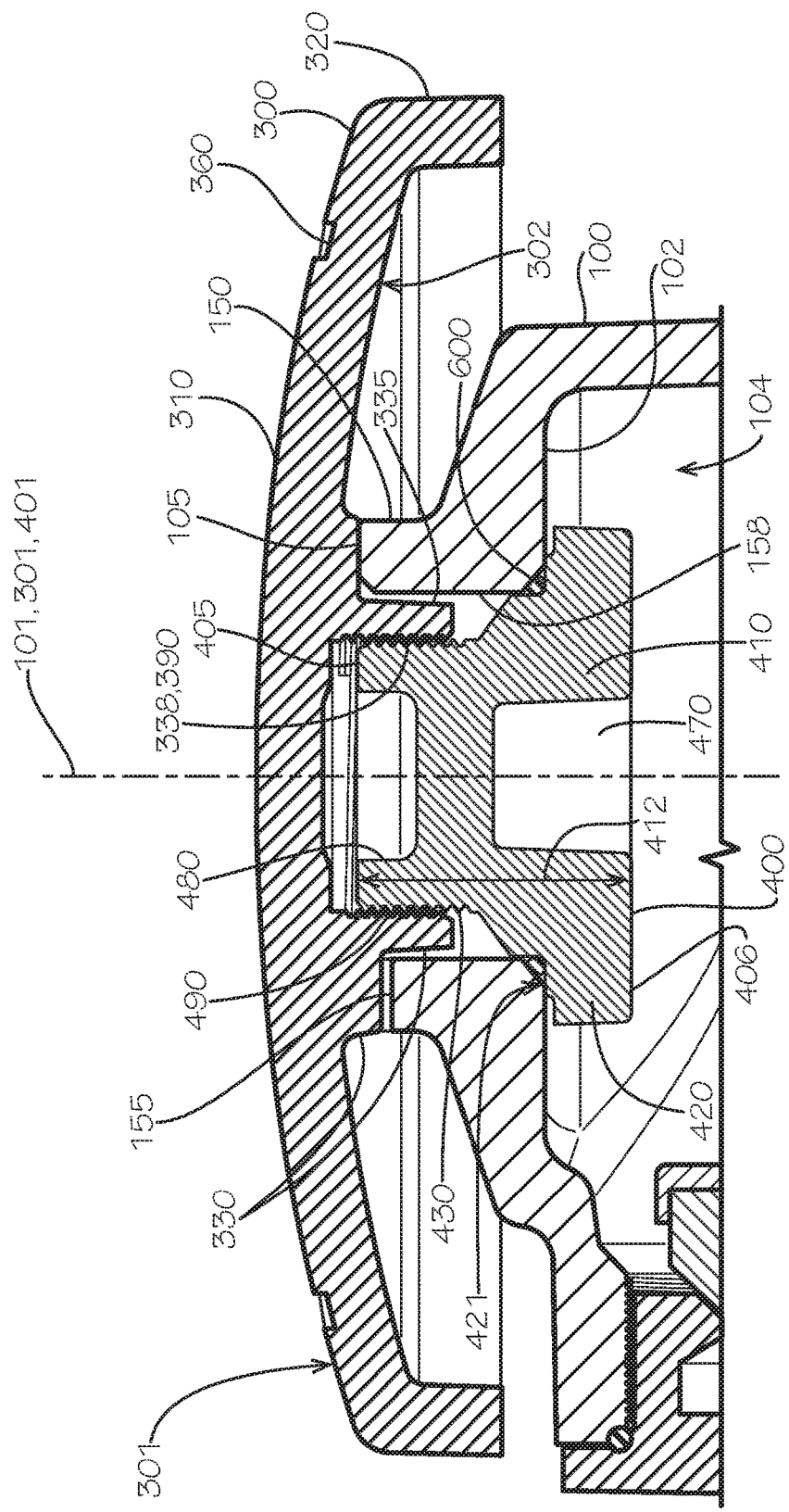
FIG. 6 is a detail view of a top end of the hydrant of FIG. 1 taken from detail 6 of FIG. 5 and showing a hydrant cap and a cap fastener installed in the hydrant.

As shown in FIG. 6, the cap fastener 400 can define a first end 405, a second end 406, and a height 412 measured between the first end 405 and the second end 406. The cap fastener can also define a diameter 417 (shown in FIG. 7). In some aspects, either the height 412 of the cap fastener 400 or the diameter 417 of the cap fastener 400 can be larger than the opening 158 and as such can be impassible through the opening 158 or otherwise held captive within the hydrant body 100 but yet can be receivable through a second opening such as, for example and without limitation, the valve boss opening 138a or the nozzle insert opening 218a. During engagement of the cap fastener 400 with the hydrant cap 300, a portion of the cap fastener 400 can extend through the opening 158 defined in the top end 105 of the hydrant body 100.

The cap fastener 400 can comprise a body 410, a flanged portion 420 proximate to the second end 406, and an engagement portion 430 proximate to the first end 405. The flanged portion 420 can define a shoulder surface 421, which can engage an interior surface 102 of the hydrant body 100 proximate to the opening 158 and thereby retain the cap fastener 400 inside the hydrant body 100. A seal 600, which can be an O-ring or any other desirable sealing material, can seal a space defined between the cap fastener 400 and the hydrant body 100 at the opening 158. The seal 600 can be used to seal against leakage of fluid in the water distribution system from between the cap fastener 400 and the hydrant body 100. In some aspects, the seal 600 can have a circular cross-section and can seal against an edge of the opening 158 that is angled with respect to the axis 101 of the hydrant body 100.

Proximate to the first end 405, the cap fastener 400 can further define a cavity 480 in the first end 405. By incorporation of the cavity 480, the material required to fabricate the cap fastener 400 can be reduced and a thickness of walls making up the cap fastener 400 can be made more uniform, which can be advantageous when the cap fastener is fabricated at least in part using a molding or casting process. The cap fastener 400 can also define a threaded portion 490 proximate to the first end 405, which can be sized to engaged within a threaded portion 390 of a cavity 338 defined in an extension portion 335 of the boss portion 330 of the hydrant cap 300. As shown, the extension portion 335 of the boss portion 330 can fit inside the opening 158 between the hydrant body 100 and the cap fastener 400, while another portion of the boss portion 330 can rest against the top end 105 of the hydrant body 100.

Figure 7:
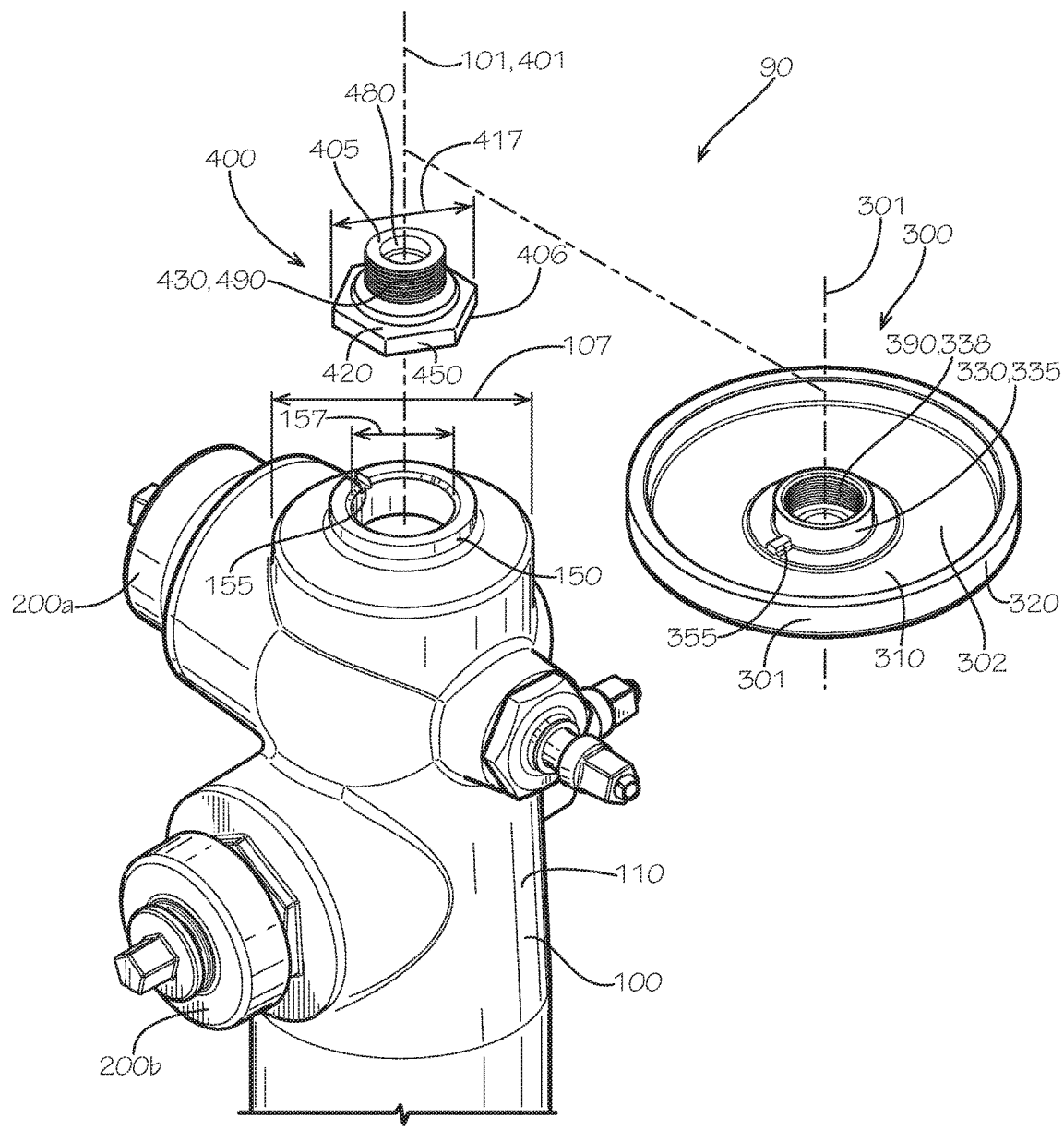
FIG. 7 is an exploded view of the top end of the hydrant of FIG. 1 showing the hydrant cap, the cap fastener, and the hydrant.

As shown in FIG. 7, in which the cap fastener 400 is shown outside and above the hydrant body 100 for better visibility, both the hydrant cap 300 and the cap fastener 400 can be configured for assembly to each other through the opening 158 defined in the top end 105 of the hydrant body 100 of the hydrant 90. The top end 105 of the hydrant body 100 can define the barrel diameter 107, while the opening 158 defined in the boss 150 can define the opening diameter 157. The hydrant 90 can comprise the anti-rotation feature 155, which can be configured to prevent rotation of the hydrant cap 300 with respect to the hydrant body 100 after the hydrant cap 300 is secured to the hydrant body 100 with the cap fastener 400. The anti-rotation feature 155 can comprise a groove or a ridge on the hydrant body 100. The groove can also be considered a notch. An anti-rotation feature 355 on the hydrant cap 300 can comprise a ridge or a groove that can be complementary in shape to the anti-rotation feature 155 of the hydrant body 100. In some aspects, as shown, the anti-rotation feature 155 can be a groove defined in the top end 105 of the hydrant body 100 and extending radially from the opening 158. In a complementary manner, the anti-rotation feature 355 of the hydrant cap 300 can be a ridge extending radially from the extension portion 335 of the boss portion 330. As shown, the flange portion 420 of the cap fastener 400 can define an rim 450 which can define, for example and without limitation, a hexagonal or other polygonal shape to facilitate rotation and tightening of the cap fastener 400.

A method of assembling the hydrant 90 can comprise positioning the hydrant cap 300 of the hydrant 90 above the top end 105 of the hydrant body 100 of the hydrant 90. The method can comprise aligning the hydrant cap 300 with the opening 158 defined in the top end 105 of the hydrant body 100. The method can comprise installing the cap fastener 400 through and from an inside cavity of the hydrant body into the hydrant cap, which can comprise inserting the cap fastener 400 through a side opening such as the side opening 138a or through a nozzle opening such as the nozzle opening 218a. Either of the side opening 138a or the nozzle opening 218a can be considered a second opening in the hydrant body 100. The method can comprise tightening the cap fastener 400 to secure the hydrant cap 300 to the hydrant body 100. Tightening the cap fastener 400 can comprise engaging the recessed shape 470 or the rim 450 defined in the second end 406 of the cap fastener 400 with a tool (not shown). In some aspects, either of the recessed shape 470 and the rim 450 can be polygonal. In other aspects, either of the recessed shape 470 and the rim 450 can be a shape other than polygonal such as, for example and without limitation, a TORX drive cavity or any one of a number of tamper-resistant style fastener cavities such as, for example and without limitation, tri-groove, drilled spanner, or asymmetric.

The method can comprise fixing an angular orientation of the hydrant cap 300 with respect to the hydrant body 100 by engaging an anti-rotation feature 355 of the hydrant cap 300 with an anti-rotation feature 155 of the hydrant body. The method can comprise positioning a seal 600 such as, for example and without limitation, an O-ring, between the cap fastener 400 and the hydrant body 100 to seal against leakage of fluid in the water distribution system from between the cap fastener 400 and the hydrant body 100. The cap fastener 400 can be made to be removable from the hydrant cap 300 only when the second end 406 of the cap fastener 400 is held stationary relative to the hydrant cap 300 and either the cap fastener 400 or the hydrant cap 300 is rotated. Such will be impossible, however, without at least a time-consuming partial disassembly of the hydrant 90 with special tools not available to the general public including removal of one or more valves such as the valve 200a from the hydrant body 100. Other caps that might be available and are separate from the hydrant body 100 are removable without otherwise disassembling the hydrant 90 and therefore could be considered less tamper-proof.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant comprising:
    a hydrant body defining a top end and a bottom end distal from the top end, the top end defining a barrel diameter and an opening;
    a hydrant cap defining an upper surface facing away from the hydrant body and a lower surface facing toward the top end of the hydrant body, the hydrant cap defining a cap diameter, the cap diameter being greater than the barrel diameter;
    a cap fastener, the hydrant cap secured to the top end of the hydrant body with the cap fastener, a portion of the cap fastener extending through the opening defined in the top end of the hydrant body; and
    an anti-rotation feature configured to prevent rotation of the hydrant cap with respect to the hydrant body after the hydrant cap is secured to the hydrant body with the cap fastener.

2. The hydrant of claim 1, wherein the cap fastener is positioned entirely below the upper surface of the hydrant cap.

3. The hydrant of claim 2, wherein at least a portion of the cap fastener is positioned inside the hydrant body.

4. The hydrant of claim 3, wherein the opening defined in the top end of the hydrant body is a first opening, a one of a height of the cap fastener and a diameter of the cap fastener being larger than the first opening and impossible through the first opening but receivable through a second opening defined in the hydrant body.

5. The hydrant of claim 1, wherein the upper surface of the hydrant cap defines identification indicia.

6. The hydrant of claim 1, wherein an axis of the cap fastener is aligned with an axis of the hydrant cap and an axis of the hydrant body.

7. The hydrant of claim 1, further comprising a seal between the cap fastener and the hydrant body.

8. The hydrant of claim 1, wherein the anti-rotation feature comprises a one of a groove and a ridge on the hydrant body and a one of a ridge and a groove on the hydrant cap.

9. The hydrant of claim 1, wherein the hydrant cap defines a main portion and a boss portion extending from the main portion, the boss portion of the hydrant cap positioned inside the opening defined in the top end of the hydrant.

10. The hydrant of claim 1, wherein the hydrant is a wet barrel hydrant.

11. A hydrant cap assembly comprising:
a hydrant cap defining an upper surface and a lower surface distal from the upper surface, the lower surface defining a cavity defining a first threaded portion, the upper surface covering the cavity, the hydrant cap comprising an anti-rotation feature, the anti rotation feature comprising a one of a ridge and a groove defined in the hydrant cap, the anti-rotation feature to prevent rotation of the hydrant cap with respect to a hydrant body after the hydrant cap is secured to the hydrant body with the cap fastener; and
a cap fastener defining a second threaded portion, the second threaded portion of the cap fastener configured to engage the first threaded portion of the hydrant cap, both the hydrant cap and the cap fastener configured to be assembled to each other through an opening defined in a top end of a hydrant, the cap fastener positioned entirely below and not visible from above the upper surface of the hydrant cap.

12. The assembly of claim 11, wherein the first threaded portion of the hydrant cap is defined in a boss portion extending from a main portion of the hydrant cap.

13. The assembly of claim 11, wherein the second threaded portion of the fastener is receivable within the first threaded portion of the hydrant cap.

14. The assembly of claim 11, wherein the cap fastener defines a first end and a second end, the first end directly engaged with the hydrant cap, the cap fastener configured to be removed from the hydrant cap only by engaging a tool with the second end of the cap fastener and rotating a one of the cap fastener and the hydrant cap with respect to the other.

15. The assembly of claim 11, wherein the cap fastener defines a one of a recessed shape and a rim in a second end of the cap fastener, the one of the recessed shape and the rim being polygonal.

16. A method of assembling a hydrant, the method comprising:
positioning a hydrant cap of the hydrant above a top end of a hydrant body of the hydrant;
aligning the hydrant cap with an opening defined in the top end of a hydrant body;
installing a cap fastener through and from an inside cavity of the hydrant body into the hydrant cap; and
tightening the cap fastener to secure the hydrant cap to the hydrant body.

17. The method of claim 16, further comprising fixing an angular orientation of the hydrant cap with respect to the hydrant body by engaging an anti-rotation feature of the hydrant cap with an anti-rotation feature of the hydrant body.

18. The method of claim 16, further comprising positioning a seal between the cap fastener and the hydrant body to seal against leakage between the cap fastener and the hydrant body.

19. The method of claim 16, wherein tightening the cap fastener comprises engaging with a tool a one of a recessed shape and an rim defined in a second end of the cap fastener, the one of the recessed shape and the rim being polygonal.

20. A hydrant comprising:
a hydrant body defining a top end and a bottom end distal from the top end defining a barrel diameter and a first opening;
a hydrant cap defining an upper surface facing away from the hydrant body and a lower surface facing toward the top end of the hydrant body, the hydrant cap defining a cap diameter, the cap diameter being greater than the barrel diameter; and
a cap fastener, the hydrant cap secured to the top end of the hydrant body with the cap fastener, a portion of the cap fastener extending through the opening defined in the top end of the hydrant body and positioned inside the hydrant body, the cap fastener positioned entirely below the upper surface of the hydrant cap, a one of a height of the cap fastener and a diameter of the cap fastener being larger than the first opening and impassible through the first opening but receivable through a second opening defined in the hydrant body.

21. The hydrant of claim 20, wherein the upper surface of the hydrant cap defines identification indicia.

22. The hydrant of claim 20, wherein an axis of the cap fastener is aligned with an axis of the hydrant cap and an axis of the hydrant body.

23. The hydrant of claim 20, further comprising a seal between the cap fastener and the hydrant body.

24. The hydrant of claim 20, wherein the hydrant comprises an anti-rotation feature configured to prevent rotation of the hydrant cap with respect to the hydrant body after the hydrant cap is secured to the hydrant body with the cap fastener.

25. The hydrant of claim 24, wherein the anti-rotation feature comprises a one of a groove and a ridge on the hydrant body and a one of a ridge and a groove on the hydrant cap.

26. The hydrant of claim 20, wherein the hydrant cap defines a main portion and a boss portion extending from the main portion, the boss portion of the hydrant cap positioned inside the opening defined in the top end of the hydrant.

27. The hydrant of claim 20, wherein the hydrant is a wet barrel hydrant.

28. A hydrant cap assembly comprising:
a hydrant cap defining an upper surface and a lower surface distal from the upper surface, the lower surface defining a cavity defining a first threaded portion, the upper surface covering the cavity; and
a cap fastener defining a second threaded portion, the second threaded portion of the cap fastener configured to engage the first threaded portion of the hydrant cap, both the hydrant cap and the cap fastener configured to be assembled to each other through an opening defined in a top end of a hydrant, the cap fastener positioned entirely below and not visible from above the upper surface of the hydrant cap, the cap fastener further defining a first end and a second end, the first end directly engaged with the hydrant cap, the cap fastener configured to be removed from the hydrant cap only by engaging a tool with the second end of the cap fastener and rotating a one of the cap fastener and the hydrant cap with respect to the other.

29. A hydrant cap assembly comprising:
a hydrant cap defining an upper surface and a lower surface distal from the upper surface, the lower surface defining a cavity defining a first threaded portion, the upper surface covering the cavity; and
a cap fastener defining a second threaded portion, the second threaded portion of the cap fastener configured to engage the first threaded portion of the hydrant cap, both the hydrant cap and the cap fastener configured to be assembled to each other through an opening defined in a top end of a hydrant, the cap fastener positioned entirely below and not visible from above the upper surface of the hydrant cap, the cap fastener further defining a one of a recessed shape and a rim in a second end of the cap fastener, the one of the recessed shape and the rim being polygonal.

* * * * *